United States Patent
Bui et al.

(10) Patent No.: US 9,548,833 B2
(45) Date of Patent: Jan. 17, 2017

(54) METHOD, APPARATUS AND SYSTEM FOR TIME DISTRIBUTION IN A TELECOMMUNICATIONS NETWORK

(75) Inventors: Dinh Thai Bui, Nozay (FR); Michel Le Pallec, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 126 days.

(21) Appl. No.: 13/978,660

(22) PCT Filed: Mar. 15, 2012

(86) PCT No.: PCT/EP2012/054584
§ 371 (c)(1),
(2), (4) Date: Aug. 12, 2013

(87) PCT Pub. No.: WO2012/130629
PCT Pub. Date: Oct. 4, 2012

(65) Prior Publication Data
US 2014/0010244 A1    Jan. 9, 2014

(30) Foreign Application Priority Data

Mar. 29, 2011    (EP) .................................... 11305345

(51) Int. Cl.
*H04J 3/06*    (2006.01)
(52) U.S. Cl.
CPC ............ *H04J 3/0697* (2013.01); *H04J 3/0667* (2013.01); *H04J 3/0664* (2013.01); *H04J 3/0673* (2013.01)
(58) Field of Classification Search
CPC ...... H04J 3/0664; H04J 3/0667; H04J 3/0673; H04J 3/0697
See application file for complete search history.

(56) References Cited

U.S. PATENT DOCUMENTS

| | | | |
|---|---|---|---|
| 6,778,526 B1 * | 8/2004 | Brown et al. | 370/351 |
| 7,570,078 B1 * | 8/2009 | Tang et al. | 326/39 |

(Continued)

FOREIGN PATENT DOCUMENTS

| | | |
|---|---|---|
| CN | 101114896 | 1/2008 |
| CN | 101599894 | 12/2009 |

(Continued)

*Primary Examiner* — Khaled Kassim
(74) *Attorney, Agent, or Firm* — Patti & Malvone Law Group, LLC

(57) ABSTRACT

The invention is directed to a clock module and method for distributing a time reference to at least one clock in a packet-switched network. The clock module includes a slave port, a master port and a local clock. The method comprises the steps of receiving a first synchronization packet at the slave port, the first synchronization packet comprising a first master clock timestamp and generating at least one internal signal comprising the first master clock timestamp. The method also includes the steps of transmitting the at least one internal signal to the master port and receiving the at least one internal signal at the master port. Then a method includes determining the internal propagation time of the signal through the clock module and generating a second synchronization packet at the master port comprising a second master clock timestamp, the second master clock timestamp comprising the sum of the first master clock timestamp and the internal propagation time. Finally, the second synchronization packet is sent to at least one other clock in the packet-switched network.

12 Claims, 5 Drawing Sheets

(56) References Cited

U.S. PATENT DOCUMENTS

| | | | |
|---|---|---|---|
| 8,971,356 B2* | 3/2015 | Geva et al. | 370/503 |
| 2004/0258097 A1* | 12/2004 | Arnold et al. | 370/503 |
| 2008/0075217 A1 | 3/2008 | Ilnicki et al. | |
| 2009/0086764 A1* | 4/2009 | Lee | H04L 69/28 370/503 |
| 2010/0020829 A1 | 1/2010 | Ruffini | |
| 2010/0074278 A1* | 3/2010 | Dobjelevski et al. | 370/503 |
| 2010/0290572 A1* | 11/2010 | Garner et al. | 375/356 |
| 2011/0002429 A1* | 1/2011 | Williams et al. | 375/356 |
| 2011/0205886 A1* | 8/2011 | Maruyama et al. | 370/225 |
| 2011/0314197 A1* | 12/2011 | Hashimoto | 710/110 |
| 2012/0128011 A1* | 5/2012 | Holmeide et al. | 370/474 |
| 2013/0121352 A1* | 5/2013 | Shen et al. | 370/503 |
| 2013/0227008 A1* | 8/2013 | Yang | 709/204 |
| 2013/0308658 A1* | 11/2013 | Le Pallec et al. | 370/503 |

FOREIGN PATENT DOCUMENTS

| | | |
|---|---|---|
| CN | 101771528 | 7/2010 |
| WO | 2008051123 | 5/2008 |

* cited by examiner

METHOD, APPARATUS AND SYSTEM FOR TIME DISTRIBUTION IN A TELECOMMUNICATIONS NETWORK

CROSS REFERENCE

This application claims the benefit of European patent application No. EP 11305345.8, filed Mar. 29, 2011 and the benefit of PCT patent application No. PCT/EP2012/054584, filed Mar. 15, 2012, the respective contents of which are hereby incorporated by reference in their entirety.

BACKGROUND

The present invention relates to the field of clock synchronisation in packet-switched telecommunications networks. More specifically, the present invention relates to a novel clock module for use with the IEEE 1588-2008 protocol standard.

Several synchronisation sensitive applications in packet-switched networks require methods and related devices for distributing a reference time and/or a reference frequency to several nodes across a network. Moreover, several standards have been developed in order to arrive at interoperable solutions.

One such standard is the IEEE 1588-2008, also known as 1588V2, which presents a hierarchical architecture of clocks organised in successive pairs of master and slave across a network. The 1588V2 standard introduces and defines the concepts of a Boundary Clock (BC) and a Transparent Clock (TC). These concepts consist of 1588V2 features which are added onto a network node, the latter being any network element such as an IP router or an Ethernet switch. For the remainder of the present description, a 1588V2 module (e.g. BC) points specifically to the aforementioned features, but globally also include the supporting network elements (e.g. the IP router) which participate in communicating 1588V2 messages to other distant 1588V2 modules.

As both BC and TC are implemented on a network node which consists of multiple communication ports, they should offer multiple PTP (Precision Time Protocol—another name given to the 1588 protocol) ports. The 1588V2 standard does not impose any specific mapping (e.g. one-to-one mapping) between PTP ports and the supporting network node communication ports. This detail is implementation-specific.

Functionally, a BC does not forward a synchronisation signal (e.g. 1588V2 Event messages). Instead, it recovers the time reference (i.e. timescale of the Grand Master clock) locally and then redistributes this reference down the clock hierarchy. Typically, a BC receives, from its peer master clock, a number of synchronisation messages, typically called PTP messages, and uses those messages to synchronise its own clock. In order to distribute the recovered time reference, it then produces new PTP messages, which are transmitted to its slave(s).

One advantage of BCs is that they are involved in what is known as the Best Master Clock Algorithm (BMCA) in order to determine the best candidate master clock, which is elected as the Grand Master (GM) clock and is positioned at the top of the hierarchical clock architecture. This allows for greater flexibility and for automatic reconfiguration of the clock hierarchical. Conversely, the main disadvantage of using BCs is that they are complex in terms of implementation. Moreover, their related noise accumulation effect is a complex process and is still under study in terms of attainable performance.

A TC, on the other hand, simply receives a PTP message from its master, and forwards it on to its slave. Before forwarding the PTP message to its slave however, the TC modifies a correction field of the PTP message to reflect the time it took for the PTP message, encapsulated within a packet, to transit the TC.

There are several advantages to using TCs. For example, TCs are relatively simple and efficient when compared to BCs (e.g. generally lower noise). On the other hand, TCs do provide some disadvantages as well. One important example of this is that the use of TCs can lead to the infringement of protocol specifications and/or protocol layer separation principles. This is because a TC modifies the header of a PTP message within packet payload, and this, despite the fact that it is not recognized as the destination node of the packet. This is known as "layer violation".

Whilst the 1588V2 standard has initially specified both types of clock, these technologies are increasingly being perceived as rivals and competing pressures are being put on industrial and research entities to try and promote one or the other.

WO 2008/051123 A1 discloses a method for clock synchronization, wherein the timestamp is updated within a packet.

US 2008/075217 A1 teaches to modify the timestamp in an original synchronization packet on the fly when it passes through either one of the standard interface converters (SIC).

US 2004/258097 A1 discloses passing on a received synchronization telegram to the next node in a cascade structure, wherein each node adds a measure of delay times occurred in the transmission to and processing at that node into the existing signal.

SUMMARY OF INVENTION

In order to solve the problems associated with the prior art, the present invention provides a method of distributing a time reference to at least one clock in a packet-switched network using a clock module including a slave port, a master port and a local clock, the method comprises the steps of: receiving a first synchronization packet at the slave port, the first synchronization packet comprising a first master clock timestamp and being destined for the clock module;

generating at least one internal signal comprising the first master clock timestamp;

transmitting the at least one internal signal to the master port;

receiving the at least one internal signal at the master port;

determining the internal propagation time of the signal through the clock module;

calculating a second master clock timestamp based on the sum of the first master clock timestamp received with the at least one internal signal at the master port and the determined internal propagation time;

generating a second synchronization packet at the master port comprising the calculated second master clock timestamp; and sending the second synchronization packet to at least one other clock in the packet-switched network.

In one embodiment, the step of determining the internal propagation time of the signal through the clock module includes the step of selecting a predetermined value of the internal propagation time of the signal.

The step of generating at least one internal signal can comprise the step of generating a real-time signal in which is encoded the first master clock timestamp.

Alternatively, the step of generating at least one internal signal can also comprise the step of generating a following up packet which contains the first master clock timestamp.

In another embodiment, the method further comprises the steps of:

recording a first local time of the local clock at which the first synchronization packet is received by the slave port; and recording a second local time of the local clock at which the internal signal is received by the master port, and wherein the step of determining the internal propagation time of the signal through the clock module includes subtracting the first local time from the second local time.

Preferably, the step of generating at least one internal signal comprises the step of generating a packet which contains the first master clock timestamp.

The present invention also provides a computer program product comprising computer-executable instructions for performing the above method.

The present invention also provides a clock module for distributing a time reference to at least one clock in a packet-switched network, the clock module comprises:

a local clock;

a slave port arranged to receive a first synchronization packet, the first synchronization packet comprising a first master clock timestamp and being destined for the clock module;

internal signal generating means arranged to generate at least one internal signal comprising the first master clock timestamp;

a master port arranged to receive the at least one internal signal;

internal signal transmitting means arranged to transmit the at least one internal signal internally from the slave port to the master port;

internal propagation time determining means arranged to determine the internal propagation time of the signal through the clock module;

calculation means for calculating a second master clock timestamp based on the sum of the first master clock timestamp received with the at least one internal signal at the master port and the determined internal propagation time;

synchronization packet generating means arranged to generate a second synchronization packet at the master port comprising the calculated second master clock timestamp; and synchronization packet sending means arranged to send the second synchronization packet to at least one other clock in the packet-switched network.

In one embodiment, the internal propagation determining means includes means arranged to select a predetermined value of the internal propagation time of the signal.

The internal signal generating means can further comprise means for generating a real-time signal in which is encoded the first master clock timestamp.

Alternatively, the internal signal generating means further comprises means for generating a following up packet which contains the first master clock timestamp.

In another embodiment, the clock module further comprises:

recording means arranged to record a first local time of the local clock at which the first synchronization packet is received by the slave port; and recoding means arranged to record a second local time of the local clock at which the internal signal is received by the master port, and wherein the internal propagation time determining means is arranged to determine the internal propagation time of the signal by subtracting the first local time from the second local time.

Preferably, the internal signal generating means is arranged to generate a packet which contains the first master clock timestamp.

Preferably, the clock module is further arranged to receive a delay request message from at least one of the at least one other clocks in the packet-switched network and, using the internal propagation time, send a delay response to the at least one of the at least one other clock in the packet-switched network, the delay response being indicative of the transmission delay between the clock module and the at least one of the at least one other clock in the packet-switched network.

Preferably, the first and second synchronisation packets are IEEE 1588V2 packets.

As will be appreciated, the present invention provides several advantages over the prior art. For example, the hybrid clock of the present invention combines the simplicity and predictability of a TC in terms of noise accumulation and the manageability of a BC in terms of automatic reconfiguration (e.g. Best Master Clock Algorithm). Another advantage of the present invention is that it avoids "layer violations" related to TCs.

BRIEF DESCRIPTION OF THE DRAWINGS

Several specific and non-limiting embodiments of the present invention will now be described with reference to the accompanying drawings, in which.

DETAILED DESCRIPTION

Figure 1:
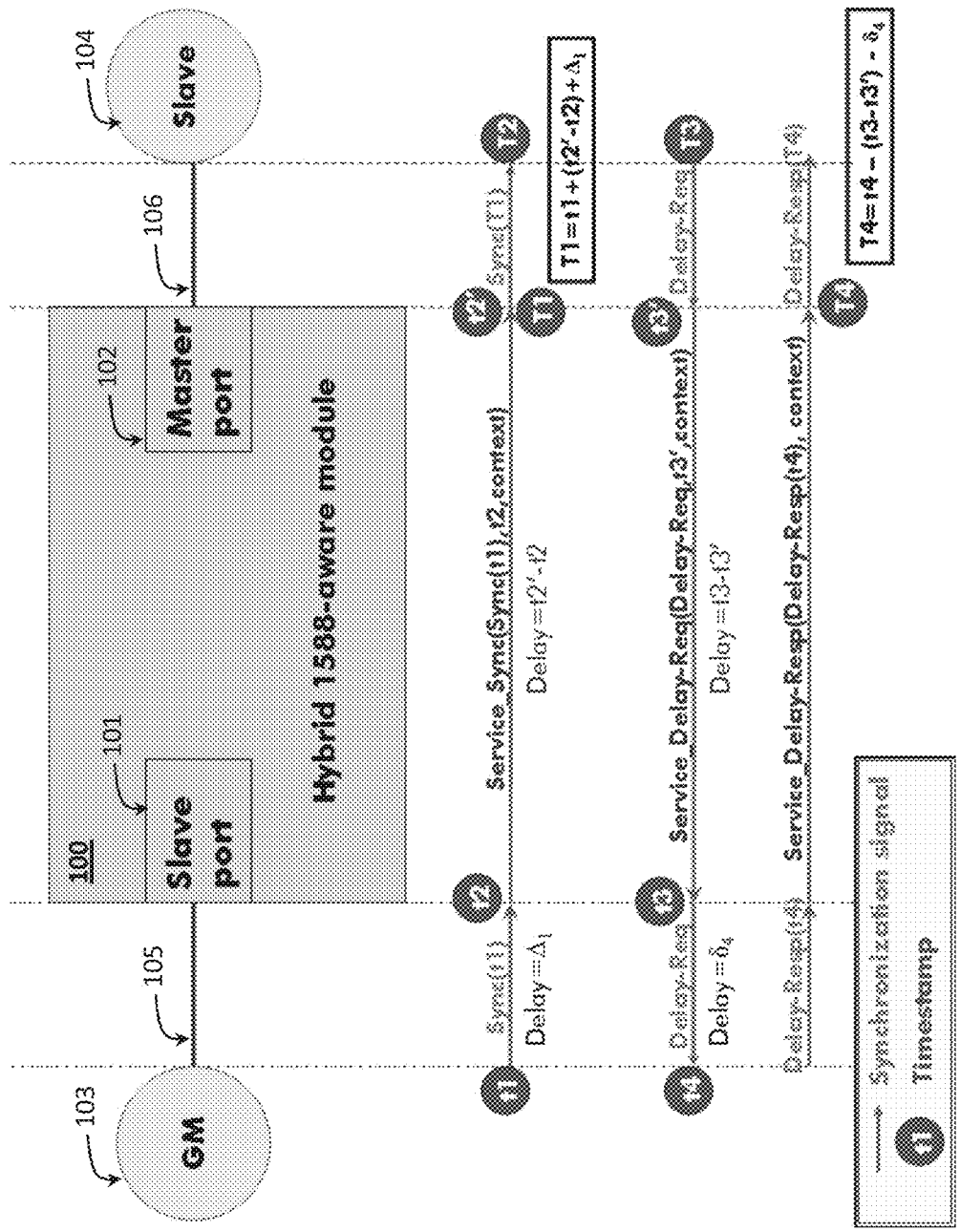
FIG. 1 represents a schematic block diagram (and associated data flow diagram) showing a clock module in accordance with a first embodiment of the present invention.

FIG. 1 shows a clock module 100 in accordance with one embodiment of the present invention. The clock module 100 comprises at least one slave port 101 and one master port 102. As will be appreciated, the clock module 100 can include several other ports, each of which being either a slave port or a master port. The slave port 101 of clock module 100 is connected, via link 105 to a grandmaster clock 103. In other examples, the slave port 101 can be connected to a master port of another clock module (e.g. a peer master clock). In accordance with the present invention, the arrangement of master and slave ports/nodes in a network can be configured using any known method, such as, for example, the Best Master Clock Algorithm (BMCA).

In one exemplary embodiment of the present invention, clock module 100 is involved in the BMCA (i.e. the default BMCA or any alternate BMCA), similarly to a BC. Thus, it participates in the hierarchical clock architecture. In such an embodiment, the clock module 100 will have BC-like attributes such as a ClockID, a default DataSet, etc. In this embodiment, the clock module 100 will also send 1588V2 Announce messages, and its ports will be assigned a 1588V2-defined state: Master, Slave or Passive.

Within this clock hierarchy, the clock module 100 receives PTP messages from its peer master clock module and sends other PTP messages (i.e. these messages are new messages with regards to incoming PTP messages) to its peer slave clocks. Within this context, the network node supporting the PTP hybrid module is the destination node of incoming packets (e.g. IP packets) or incoming frames (e.g. Ethernet frames). Thus, no "layer violation" is incurred.

With reference to FIG. 1, the operation of the clock module 100 will now be described. It is assumed in the following steps that the unidirectional delays $\Delta_1$ and $\delta_4$ are known. As will be appreciated by the skilled reader however, there exists a variety of known methods for determining these unidirectional delays in cases where they are not known. These include methods related to the physical layer or related to the 1588V2 standard, such as the peer-delay mechanism. Using the latter method, the time offset between the clock module 100 and the grandmaster clock 103 is cancelled out within the roundtrip system of equations. The measurement error is therefore only related to the frequency offset of the clock module 100 with regards to the reference frequency of the grandmaster clock 103. This error is negligible if the peer-delay response time, i.e. the time duration between the reception of the peer-delay request and the transmission of the related peer-delay response, is relatively short (i.e. within milliseconds). Another method of determining these delays is described below.

In FIG. 1, the time stamps are represented by circles and synchronization signals are represented by arrows. A PTP Synch message Sync(t1) is first generated by the grandmaster clock 103. Sync(t1) message comprises timestamp t1. The timestamp t1 is a representation of the local time of the grandmaster clock 103, and is generated by the grandmaster clock 103. As can be seen in FIG. 1, there exists a transmission delay $\Delta_1$ associated with the Sync(t1) message propagating through link 105 to arrive at the slave port 101 of clock module 100. As mentioned above, for the purposes of describing the present invention, the measurement of delay $\Delta_1$ can be assumed to have been performed.

Upon arrival of the Sync(t1) message at the slave port 101, clock module 100 produces timestamp t2. In the first embodiment of the present invention, clock module 100 encapsulates the Sync(t1) message into internal packet Service_Sync. The Service_Sync packet contains the Sync(t1) message, as well as timestamp t2 and information related to the internal context structure of the clock module 100. The internal context structure consists of a data structure which allows the system to gather (correlated) information related to the PTP flow between a given upstream 'master' clock (identified by the master clockID) and downstream 'slave' clock (identified by the slave clockID). For instance, the internal context structure stores the related computed delays t2'–t2 and t3–t3', the clockID of the 'master' clock connected to the hybrid module Slave port, the clockID of the 'slave' clock connected to the hybrid module Master port, etc.

While the first embodiment described with reference to FIG. 1 provides for the production of internal data packet Service_Sync, the present invention also provides for the generation of any other type of internal signal arranged to transmit information contained in the Sync(t1) message, timestamp t2 and the context information from the slave port 101, internally through to the master port 102, as described below.

When the master port receives the internal Service_Sync packet, the clock module 100 calculates the delay given by the equation t2'–t2, where t2 represents the time at which the Sync(t1) message arrived at the slave port 101 via link 105, and t2' represents the time at which the internal Service_Sync packet arrived at the master port 102. The clock module 100 then calculates a new timestamp T1, using t1, t2'–t2 and $\Delta_1$. As shown in FIG. 1, this new timestamp T1 will be equal to t1+(t2'–t2)+$\Delta_1$, where t1 represents the local time of the grandmaster clock 103, t2' represents the time at which the internal Service_Sync packet arrived at the master port 102, t2 represents the time at which the Synch(t1) message arrived at the slave port 101 via link 105 and $\Delta_1$ represents the transmission delay associated with the Sync (t1) message propagating through link 105 to arrive at the slave port 101 of clock module 100 from the transmitting port of the grandmaster clock 103. Using this new timestamp T1, the clock module 100 produces a new the Sync(T1) message which it then sends, via link 106 to slave clock 104. Slave clock 104 captures timestamp T2 (according to its local clock) at the reception of Sync(T1) message. If slave clock 104 is a clock module in accordance with the present invention, the abovementioned process can be reiterated.

Accordingly, similarly to a 1588V2 standardized BC, a clock module in accordance with the present invention uses information it receives from an upstream clock to produce a new Synch signal. The advantage of this is that, in terms of the PTP protocol, clock module 100 will be the unique destination node for each Synch message that it uses to propagate timing information. Accordingly, it will be possible for it to de-encapsulate such a Synch message without layer violation. Clock module 100 can also receive other Synch messages from other sources. If such messages are not destined for clock module 100 however, they will not be used to propagate timing information to other clock modules.

Dissimilarly to a 1588V2 standardized BC, there is no need for clock module 100 to use a "time recovery" block or any related filtering algorithms, as the new Sync(T1) message will be based on the grandmaster clock 103 time, propagation delay time $\Delta_1$, and resident time t2'-t2. Instead of this novel approach, 1588 standardized BCs receive a plurality of Sync(t1) and use these messages, together with filtering algorithms, to converge towards the reference time. This process is considerably slower and more complex than the method in accordance with the present invention. Moreover, as mentioned above, this process gives rise to low frequency wander accumulation along the synchronisation chain, degrading the synchronization accuracy.

In another operational mode of a clock module 100 in accordance with the present invention, the slave clock 104 can be set for "two-way". When set in two way mode, a slave clock module will not only receive timing information as described above, but will also request and receive delay information relating to the propagation delay between itself and the upstream clock module 100 it is connected to. An example of this is shown in the timing diagram of FIG. 1.

When the two-way mode is deployed at the slave clock 104, the clock module 100 is arranged to execute the same steps as above and will, and is further arranged to execute several additional steps. These operations allow the slave clock 104 to determine the upstream link delay between itself and clock module 100.

With reference to FIG. 1, the slave clock 104 is arranged to generate a delay request message Delay_Req. The slave 104 then sends the Delay_Req message to the master port 102 of the clock module 100. Upon receipt of the Delay_Req message at the master port 102 of the clock module 100, the clock module 100 produces time stamp t3', which thereby becomes an indication of the local time at which the Delay_Req message was received.

Clock module 100 then encapsulates the Delay_Req message into an internal packet Service_Delay_Req, which the clock module 100 sends to the slave port 102. The Service_Delay_Req packet contains the Delay_Req message, as well as timestamp t3' and the internal associated context structure. As described above, the latter allows for gathering computed delays and other correlated information related to the timing information flow across clock module 100.

As is the case for the one-way mode described above, the two-way mode described with reference to the embodiment of FIG. 1 provides for the production of internal data packet Service_Delay_Req. The present invention however also provides for the generation of any other type of internal signal arranged to transmit information contained in the Service_Delay_Req message, timestamp t3' and the context information from the master port 102, internally through to the slave port 102, as described below with reference to further embodiments.

When the slave port receives the internal Service_Delay_Req packet, the clock module 100 calculates the resident time of the Service_Delay_Req message. That is to say the time required for the information contained in the Service_Delay_Req message to be transmitted internally from the master port 101 to the slave port 102. With reference to FIG. 1, this is given by the equation t3−t3', where t3' represents the time at which the Delay_Req message arrived at the master port 102 via link 106, and t3 represents the time at which the internal Service_Delay_Req packet arrived at the slave port 101. The resident time t3−t3' is memorised locally within the internal context information structure, together with other related information (e.g. message sequence number). At slave port 101, a new Delay_Req message is created and sent to the grandmaster clock 103.

When the new Delay_Req message is received at the grandmaster clock 103, the grandmaster produces a timestamp t4, which is included in a PTP Delay_Resp(t4) message that it sends to the slave port 101 of the clock module 100.

Upon arrival of the Delay_Resp(t4) message at the slave port 101, clock module 100 encapsulates the Delay_Resp(t4) message into internal packet Service_Delay_Resp. The Service_Delay_Resp packet contains the Delay_Resp(t4) message and is sent internally to the master port 102.

When the master port 102 receives the internal Service_Delay_Resp packet, the clock module 100 calculates a new timestamp T4, using t4, t3−t3' and $\delta_4$, t3−t3' having been previously memorised within the internal context structure. As shown in FIG. 1, this new timestamp T4 will be equal to t4−(t3−t3')−$\delta_4$, where t4 represents the local time of the grandmaster clock 103, t3' represents the time at which the Delay_Req message arrived at the master port 102, t3 represents the time at which the Service_Delay_Req packet arrived at the slave port 101 and $\delta_4$ represents the transmission delay associated with the Delay_Req message propagating through link 105 to arrive at grandmaster clock 103. Using this new timestamp T4, the clock module 100 produces a new the Delay_Resp(T4) message which it then sends, via link 106 to slave clock 104. Slave clock 104 then uses the sour timestamps T1, T2, T3 and T4 in order to estimate the unidirectional delays induced by link 106.

Figure 2:
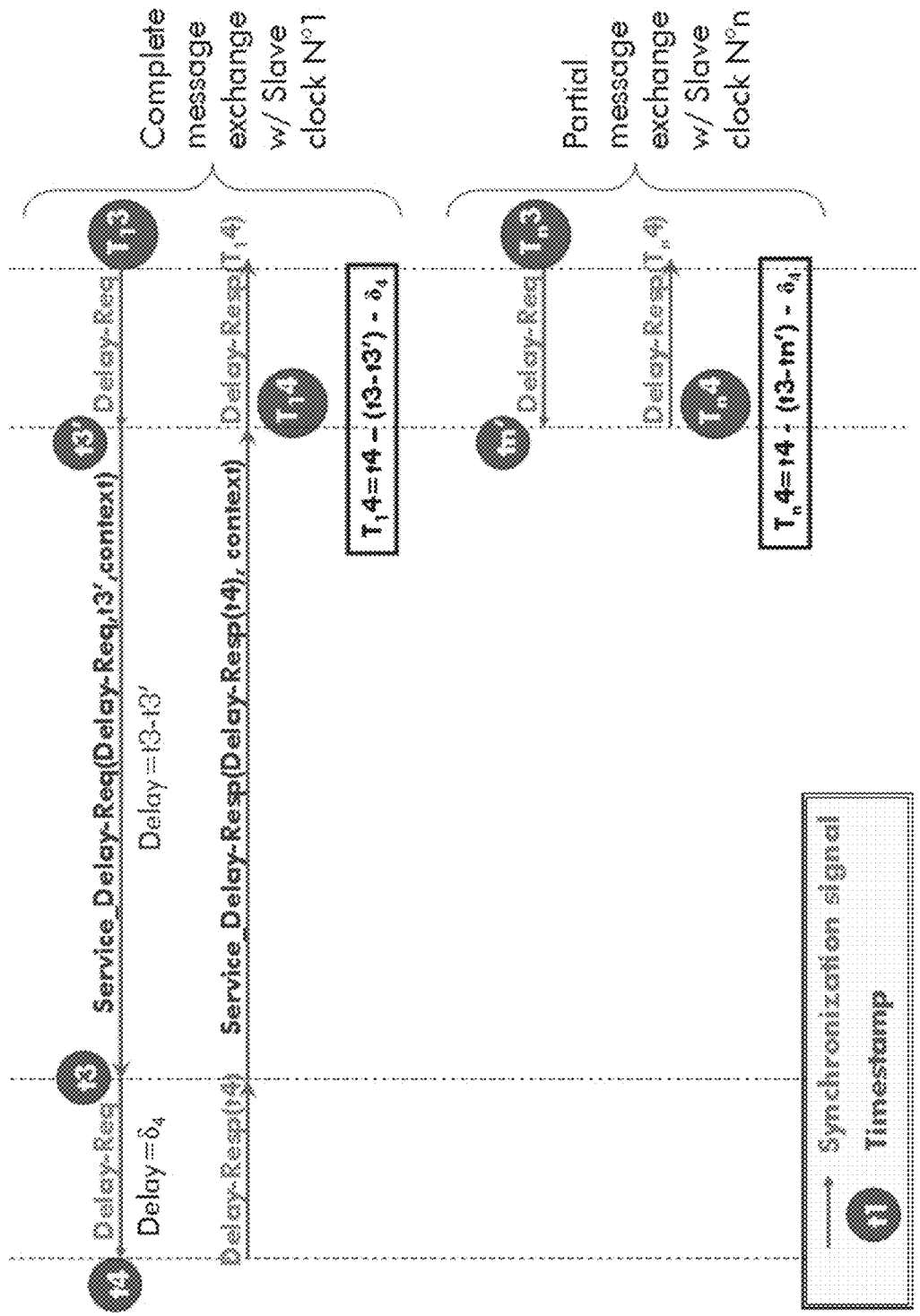
FIG. 2 represents a data flow diagram of a second embodiment of the present invention.

With reference to FIG. 2, a second embodiment of the present invention will now be described. The applicant has appreciated that by using the present invention in two-way mode, the rate of Delay_Req/Delay_Resp message exchanges with the grandmaster 103 is proportional to the number of downstream slave clocks 104. In order to allow the invention to avoid congestion of such messages at the grandmaster clock 103, it is proposed to perform the complete combination of the two-way mode steps (including Delay_Req/Delay_Resp exchange with a single slave 104, and to use a portion of the information generated in the exchange to derive the respective "T4" timestamp for other slaves. The principles of operation of this embodiment are represented in FIG. 2.

The $T_n4$ timestamp ("T4" timestamp related to Slave clock number n) is derived from $T_14$ ("T4" timestamp related to the Slave clock number 1) as $T_n4=T_14+(tn'-t3')$ assuming that the response time (the time between the reception of the Delay_Req and the transmission of the associated Delay_Resp) is constant, for simplicity. Otherwise, a delta has to be measured and taken into account within the $T_n4$ computation. Thus, $T_n4=t4-(t3-t'3)-\delta4+(tn'-t'3)=t4-(t3-tn')-\delta4$, where tn' is the timestamp captured by the hybrid clock module 100 at reception of the Delay_Req message from the slave clock n (the equivalent to t3', though for the slave n). Accordingly, by using this embodiment, it is possible to avoid congestion of Delay_Req and Delay_Resp message at the grandmaster 103.

Figure 3:
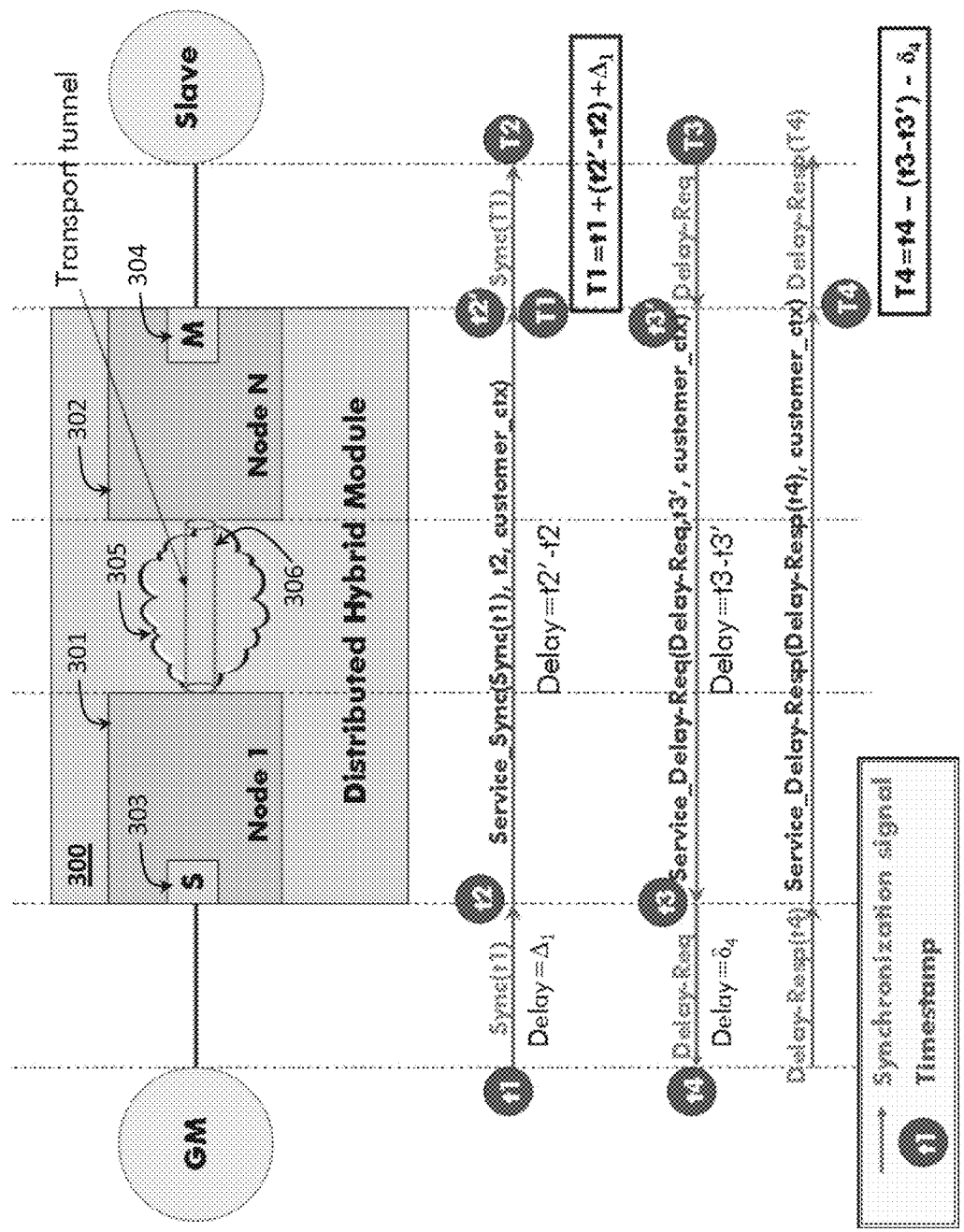
FIG. 3 represents a schematic block diagram (and associated data flow diagram) showing a clock module in accordance with a third embodiment of the present invention.

FIG. 3 represents another embodiment of the present invention. The embodiment of FIG. 3 is very similar to the above embodiments, with one important difference. Similarly to the above embodiments, the internal signal which carries timing information inside the clock module 300 is implemented as a packet-based signal. The difference with this embodiment however is that the clock module 300 comprises a plurality of network nodes included illustrated nodes Node 1 and Node N at the network boundary. Thus, the internal packet-based information now travels from the slave port of Node 1, through tunnel 306 (e.g. an IPSec tunnel) across a network 305, to arrive at the master port 304 of node N 302. As can be seen from the diagram of FIG. 3, the data flow diagram of this embodiment is very similar to that of the first embodiment and, for the sake of brevity, will not be repeated here. One important difference with regard to the packet-based signals of the embodiment is the presence of the customer ID parameter customer_ctx in the Service_Sync packet, as shown in FIG. 3. This customer_ctx parameter is useful when the transport tunnel is shared between different customer timing flows.

In this embodiment, the "distributed" or "network" clock module 300 transports the customer timing flow across itself without having to recover each Customer's time reference. Thus, there is no need to implement additional recovery blocks (e.g. several Phase-Lock-Loops) on each network node within the module 300 domain. Consequently, the proposed architecture of clock module 300 can cope with an important number of different customers (each having independent service time-of-day to be transported across the domain). The accuracy of such a method depends on the frequency offset between the Transport Network Operator (TNO) and its related customers.

Figure 4:
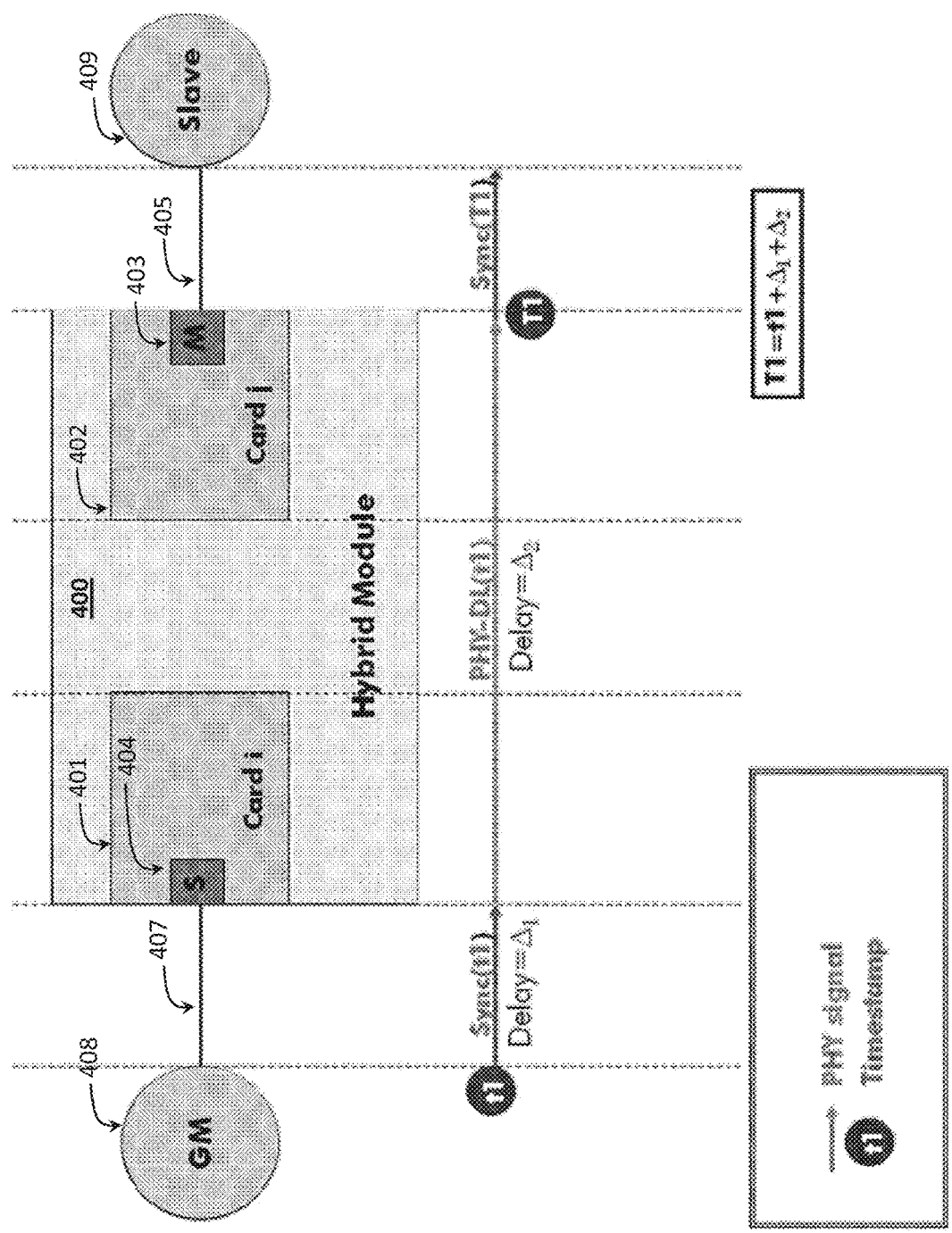
FIG. 4 represents a schematic block diagram (and associated data flow diagram) showing a clock module in accordance with a fourth embodiment of the present invention.

FIG. 4 represents another embodiment in accordance with the present invention. FIG. 4 shows a clock module 400 in accordance with one embodiment of the present invention. The clock module 400 consists of PTP features implemented on a single network node made of multiple network interface cards 401, 402. Similarly to the first embodiment, the clock module 400 comprises at least one PTP slave port 404 associated to a physical port on card i. The slave port 404 is connected to the grandmaster clock 408 via link 407. The clock module 400 also comprises at least one PTP master port 403 associated to a physical port on card j. The master port 403 is connected to slave clock 409 via link 405.

Functional operations are similar to the first embodiment except that the internal information exchange, meaning the Service_Sync internal packet, is now replaced by an internal physical signal PHY-DL(t1). The physical signal PHY-DL (t1) has a propagation delay $\Delta 2$ between the PTP slave port 404 and the PTP master port 403. This delay can be considered as constant over time with regards to the targeted time accuracy, as this is a physical propagation delay. Thus, it can be measured once (e.g. measured at the clock module 400 commissioning or calibrated/engineered during its conception/design) and can be used during the whole operation period of clock module 400. Thus, $\Delta 2$ is a known value with regards to all cards within the network node supporting clock module 400.

As soon as it receives the Sync(t1) message, the PTP Slave port sends the PHY-DL(t1) physical signal towards the PTP Master port. The PHY-DL(t1) signal is an internal physical signal which comprises t1. That is to say that the t1 timestamp is embedded or encoded into the PHY-DL(t1) signal. When the master port 403 receives the internal signal PHY-DL(t1), it immediately sends towards the slave clock a Sync(T1) message at detection of PHY-DL(t1) signal. For the purpose of this detection, PHY_DL(t1) signal should embed some specific physical pattern that allows the master port 403 to recognize that it comes from the given PTP slave port 404 (and not another port), also a sequence number can also be encoded as well. The internal physical signal PHY-DL(t1) allows for communication of the t1 and the related context. At reception of this internal signal PHY-DL(t1) by the master port 403, the latter computes the timestamp T1 based on t1, $\Delta 1$ and $\Delta 2$, T1=t1+$\Delta 1$+$\Delta 2$. It also creates a new PTP Sync(T1) message in order to communicate the T1 timestamp to the Slave clock. T1 allows the slave clock 409 to synchronize its clock to the grandmaster time reference.

Figure 5:
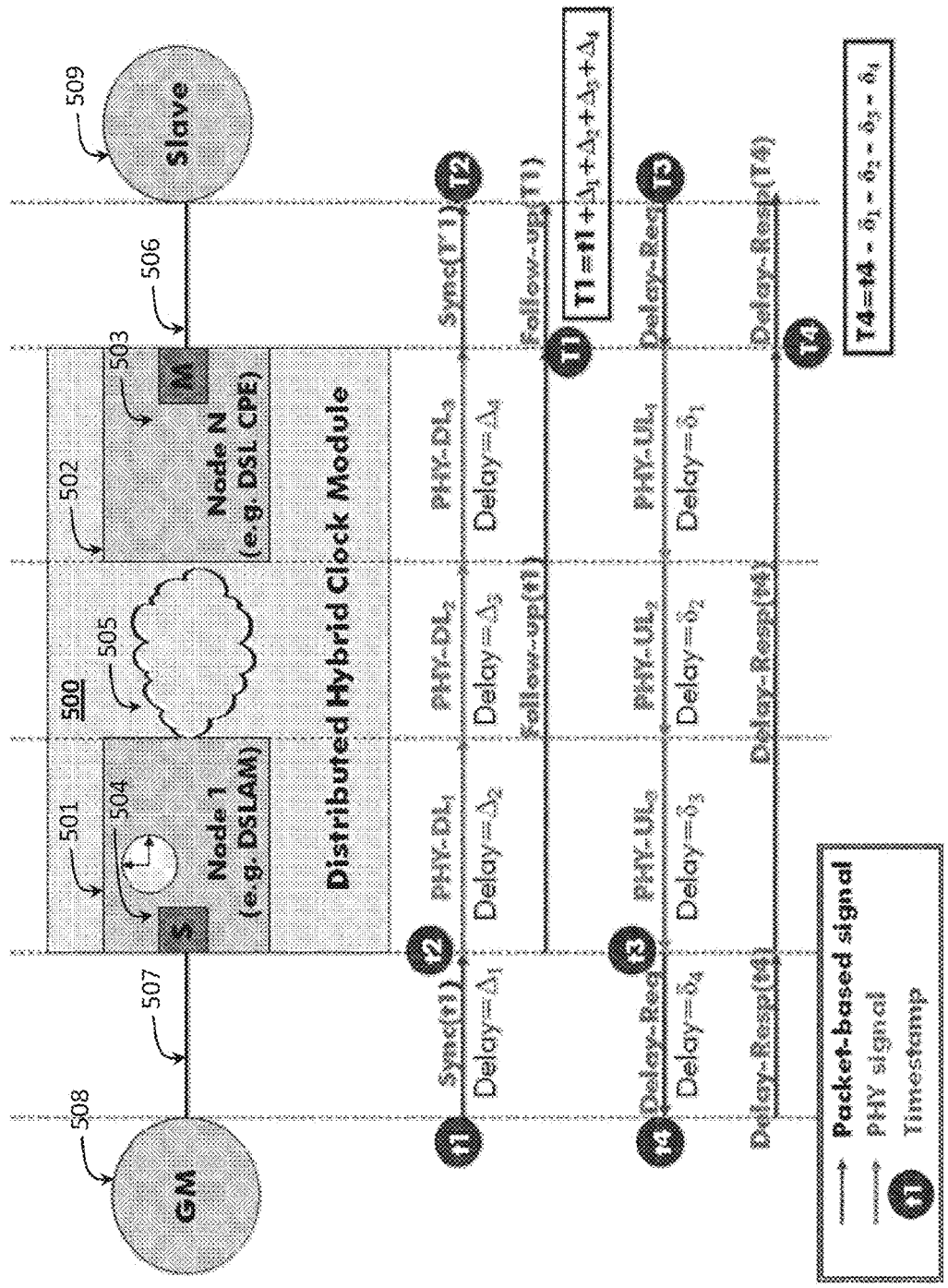
FIG. 5 represents a schematic block diagram (and associated data flow diagram) showing a clock module in accordance with a fifth embodiment of the present invention.

FIG. 5 represents another embodiment in accordance with the present invention. FIG. 5 shows a clock module 500 in accordance with one embodiment of the present invention. The clock module 500 comprises at least two nodes 501 and 502. Node 501 includes a slave port 504 and node 502 comprises a master port 503. Node 501 and node 502 are connected through a network 505. As will be appreciated, the clock module 500 can include several other ports, each of which being a slave port or a master port or a passive port. The slave port 504 of node 501 of clock module 500 is connected, via link 507 to a grandmaster clock 508. In other examples, the slave port 504 can be connected to a master port of another clock module. In accordance with the present invention, the arrangement of master and slave ports/nodes in a network can be configured using any known method, such as, for example, the 1588V2 default Best Master Clock Algorithm (BMCA).

With reference to FIG. 5, the operation of the clock module 500 will now be described. It is assumed in the following steps that the unidirectional delays $\Delta_1$ and $\delta_4$ are known. As mentioned above however, there exists a variety of known methods for determining these unidirectional delays in cases where they are not known.

In FIG. 5, the timestamps are represented by circles and synchronization signals are represented by arrows. A PTP synch message Sync(t1) is first generated by the grandmaster clock 508. The Sync(t1) message comprises timestamp t1. The timestamp t1 is a representation of the local time of the grandmaster clock 508, and is generated by the grandmaster clock 508. As can be seen in FIG. 5, there exists a transmission delay $\Delta_1$ associated with the Sync(t1) message propagating through link 507 to arrive at the slave port 504 of node 501 of clock module 500. As mentioned above, for the purposes of describing the present invention, the measurement of delay $\Delta_1$ is assumed to have been already performed.

Upon arrival of the Sync(t1) message at the slave port 504, clock module 500 produces timestamp t2 and sends out an intra-node PHY-DL$_1$ signal as it receives the Sync(t1) message from the grandmaster 508 (or adjacent master clock). The destination of this signal is the output port node 501 (not shown) on the path towards the clock module 500 master port (i.e. master port 503 of node 502). The output port of node 501 then sends an inter-node PHY-DL$_2$ signal as it receives the PHY-DL$_1$ signal. This sequence of receipt, creation and transmission of intra-node and inter-node signals is recreated for every hop in the network 505. As is the case in the previous embodiment, the physical signal PHY-DL$_1$ has a propagation delay $\Delta_2$ between the PTP slave port 504 to the PTP master port (not shown) of node 501. Similarly, PHY-DL$_2$ has a propagation delay $\Delta_3$ between the PTP master port of node 501 (not shown) and the PTP slave port of node 502 (not shown). Finally, PHY-DL$_3$ has a propagation delay $\Delta_4$ between the PTP slave port of node 502 (not shown) and the PTP master port 503 of node 502.

These delays can be considered as constant over time with regards to the targeted time accuracy, as this is a physical propagation delay. Thus, they can be measured once and can be used during the whole operation period of clock module 500. Thus, $\Delta_2$, $\Delta_3$, $\Delta_4$ are known values with regards to all cards within the network node supporting clock module 500. It is noted that if the transmission of the next signal (e.g. PHY-DL$_2$) is not immediate following the reception of the previous signal (e.g. PHY-DL$_1$), then the elapsed time between the two events can be measured by the operating point (e.g. output port of node 501) and communicated to the master port 503.

When signal PHY-DL$_3$ is received at master port 503, the clock module 500 generates a new Sync message Sync(T'1) which estimated time stamp T'1.

In this embodiment, as the different PHY-DL signals do not convey t1 information, this later is communicated via a packet-based method (e.g. Follow-up message) by the slave port 504 to the clock module 500 master port 503. This internal message allows for communicating t1 and the related context (this context having the similar role with regards to the first embodiment) using a packet protocol for more flexibility in term of information size transported (i.e. the number of information bits transported by a physical signal is limited, while PTP timestamps can occupy up to 10 bytes). The new timestamp T1 can then be derived based on t1 and including the clock module 500 resident time (i.e. $\Delta_2$, $\Delta_3$, $\Delta_4$)+the transmit delay $\Delta_1$. Finally, T1 is communicated to the slave clock 509 by the clock module 500 via a Follow-up message, thereby completing the second step of the two-step mode. As can be seen from data flow diagram of FIG. 5, the delay request procedure will be similar to that of the second embodiment of the present invention, thought with the incorporation of physical signals (PHY-UL) instead of internal timestamps, as described above with reference to PHY-DL$_1$, PHY-DL$_2$ and PHY-DL$_3$.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labelled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method of distributing a time reference to at least one clock in a packet-switched network using a clock module including a slave port, a master port and a local clock, the method comprising the steps of:

receiving a first synchronization packet from a master clock at the slave port, the first synchronization packet comprising a first master clock timestamp and being destined for the clock module;

recording a first local time of the local clock at which the first synchronization packet is received by the slave port;

generating at least one internal signal comprising the first master clock timestamp;

transmitting the at least one internal signal to the master port;

receiving the at least one internal signal at the master port and recording a second local time of the local clock at which the internal signal is received by the master port;

determining the internal propagation time of the signal through the clock module by subtracting the first local time from the second local time;

calculating a second master clock timestamp based on the sum of the first master clock timestamp received with the at least one internal signal at the master port and the determined internal propagation time;

generating a second synchronization packet at the master port comprising the calculated second master clock timestamp; and sending the second synchronization packet to at least one other clock in the packet-switched network;

receiving a delay request message from at least one of the at least one other clocks in the packet-switched network and, using the internal propagation time, sending a delay response to the at least one of the at least one other clocks in the packet-switched network, the delay response being indicative of a transmission delay between the clock module and the at least one of the at least one other clocks in the packet-switched network.

2. The method of claim 1, wherein the step of determining the internal propagation time of the signal through the clock module includes the step of selecting a predetermined value of the internal propagation time of the signal.

3. The method of claim 2, wherein the step of generating at least one internal signal comprises the step of:

generating a real-time signal in which is encoded the first master clock timestamp.

4. The method of claim 2, wherein the step of generating at least one internal signal also comprises the step of:

generating a following up packet which contains the first master clock timestamp.

5. The method claim 1, wherein the step of generating at least one internal signal comprises the step of:

generating a packet which contains the first master clock timestamp.

6. A clock module for distributing a time reference to at least one clock in a packet-switched network, the clock module comprising:

a local clock;

a slave port arranged to receive a first synchronization packet from a master clock, the first synchronization packet comprising a first master clock timestamp and being destined for the clock module, the slave port arranged to record a first local time of the local clock at which the first synchronization packet is received and generate at least one internal signal comprising the first master clock timestamp;

a master port arranged to receive the at least one internal signal and record a second local time of the local clock at which the internal signal is received;

said clock module further arranged to perform the steps of:

transmitting the at least one internal signal internally from the slave port to the master port;

determining the internal propagation time of the signal through the clock module subtracting the first local time from the second local time;

calculating a second master clock timestamp based on the sum of the first master clock timestamp received with the at least one internal signal at the master port and the determined internal propagation time;

generating a second synchronization packet at the master port comprising the calculated second master clock timestamp; and sending the second synchronization packet to at least one other clock in the packet-switched network;

wherein the clock module is further arranged to receive a delay request message from at least one of the at least one other clocks in the packet-switched network and, using the internal propagation time, send a delay response to the at least one of the at least one other clocks in the packet-switched network, the delay response being indicative of a transmission delay between the clock module and the at least one of the at least one other clocks in the packet-switched network.

7. The clock module of claim 6, wherein the step of determining the internal propagation time further comprises selecting a predetermined value of the internal propagation time of the signal.

8. The clock module of claim 7, wherein the step of generating an internal signal further comprises generating a real-time signal in which is encoded the first master clock timestamp.

9. The clock module of claim 7, wherein the step of generating an internal signal further comprises generating a following up packet which contains the first master clock timestamp.

10. The clock module of claim 6, wherein the step of generating an internal signal further comprises generating a packet which contains the first master clock timestamp.

11. The clock module of claim 6, wherein the first and second synchronisation packets are IEEE 1588V2 packets.

12. A computer-executable or machine-executable program product comprising at least one non-transitory computer-readable storage medium having computer-executable instructions for performing a method of distributing a time reference to at least one clock in a packet-switched network using a clock module including a slave port, a master port and a local clock, the method comprising the steps of:

receiving a first synchronization packet from a master clock at the slave port, the first synchronization packet comprising a first master clock timestamp and being destined for the clock module;

recording a first local time of the local clock at which the first synchronization packet is received by the slave port, generating at least one internal signal comprising the first master clock timestamp;

transmitting the at least one internal signal to the master port;

receiving the at least one internal signal at the master port and recording a second local time of the local clock at which the internal signal is received by the master port;

determining the internal propagation time of the signal through the clock module by subtracting the first local time from the second local time;

calculating a second master clock timestamp based on the sum of the first master clock timestamp received with the at least one internal signal at the master port and the determined internal propagation time;

generating a second synchronization packet at the master port comprising the calculated second master clock timestamp; and sending the second synchronization packet to at least one other clock in the packet-switched network;

receiving a delay request message from at least one of the at least one other clocks in the packet-switched network and, using the internal propagation time, sending a delay response to the at least one of the at least one other clocks in the packet-switched network, the delay response being indicative of a transmission delay between the clock module and the at least one of the at least one other clocks in the packet-switched network.

* * * * *